United States Patent Office 2,951,069
Patented Aug. 30, 1960

2,951,069

DISAZO-DYESTUFFS CONTAINING METAL

Erich Brenneisen, Hofheim (Taunus), and Richard Huss and Arthur Siebert, Frankfurt am Main, Germany, assignors to Farbwerke Hoechst Aktiengesellschaft vormals Meister Lucius & Brüning, Frankfurt am Main, Germany, a corporation of Germany No Drawing. Filed Mar. 26, 1957, Ser. No. 648,499

Claims priority, application Germany Mar. 31, 1956

6 Claims. (Cl. 260—147)

The present invention relates to valuable new metalliferous disazo-dyestuffs, more particularly it relates to the copper, nickel, cobalt or zinc salts of disazo-dyestuffs corresponding to the following general formula:

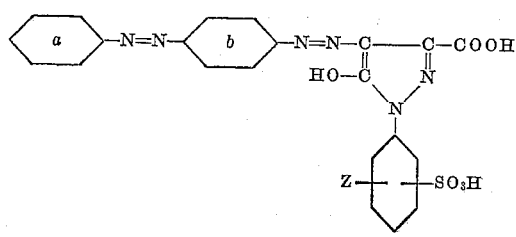

wherein the benzene nucleus $a$ may be substituted by methyl groups or a carboxylic acid group and the benzene nucleus $b$ may contain methyl groups as substituents, and Z represents hydrogen or a sulfonic acid group.

Our copending application Serial No. 523,108, filed July 19, 1955, now Patent 2,816,886, describes a process for the manufacture of salts of disazo-dyestuffs, wherein an organic base, such as dicyclohexylamine, is reacted with a disazo-dyestuff obtainable by coupling diazotized 4-amino-1,1'-azobenzene, which may be substituted by methyl and/or carboxylic acid groups in such a manner that each benzene nucleus contains only one of these substitutents, with a 1-phenyl-5-pyrazolone-3-carboxylic acid which may contain a sulfonic acid group in the phenyl nucleus. The dyestuff salts so obtained are soluble in organic solvents and, therefore, especially suitable for coloring lacquers, such as alcohol lacquers, acetyl or nitrocellulose lacquers. The colorations obtained with these dyestuff salts possess a remarkable fastness to light.

Now we have found that dyestuffs of an improved fastness to light are obtained by reacting a copper, nickel, cobalt or zinc salt of an organic or inorganic acid with a disazo-dyestuff obtainable by coupling diazotized 4-amino-1,1'-azobenzene, which may be substituted by methyl or carboxylic acid groups, with a 1-phenyl-5-pyrazolone-3-carboxylic acid containing at least one sulfonic acid group in the phenyl nucleus. The metal compounds of the dyestuffs obtainable by this invention are soluble in organic solvents. The lacquers colored with these dyestuff salts have an excellent fastness to light.

When the reaction with the metal salts is conducted in the presence of organic bases, the solubility is further improved, however, the fastness to light somewhat decreases. This procedure enables to prepare metalliferous dyestuffs of a very good solubility, which are superior to the salts with organic bases as regards their fastness to light. It is known to color nitrocellulose lacquers with complex metallic compounds. These products are complex metallic compounds of azo-dyestuffs which contain in ortho- and othro'-position to the azobridge groupings capable of forming a complex compound, whereas the dyestuffs obtainable by the present invention contain a hydroxyl group only in one orthoposition to the azo-bridge. It was, therefore, surprising that the metal compounds of these dyestuffs yield dyeings of an excellent fastness to light and that they are in some cases even superior to the known complex metallic compounds. The reaction of these acid dyestuffs with the metal salts probably brings about first a true salt formation with the acid groups of the dyestuff molecule. It cannot yet be decided how far complex forming powers influence the fastness properties of these dyestuffs.

The metalliferous dyestuffs obtainable by the present invention are very suitable for coloring lacquers, such as alcohol lacquers from natural and/or synthetic resins, acetyl or nitrocellulose lacquers, furthermore, for coloring polymers, copolymers and condensation products, which are usually applied for lacquering foils. The new dyestuffs can also be used with advantage for coloring wood staining compositions, Celluloid and for the production of offset printing colors.

The following examples serve to illustrate the invention, but they are not intended to limit it thereto, the parts being by weight unless otherwise stated and the relationship of parts by weight to parts by volume being the same as that of the kilogram to the liter:

*Example 1*

19.7 parts of 4-amino-1,1'-azobenzene are stirred with 63 parts by volume of 5 N-hydrochloric acid and 200 parts by volume of water and diazotized at 3–5° C. with 20 parts by volume of a 5 N-sodium nitrite solution, while adding ice. Stirring is continued for a further 1–2 hours.

The diazo-solution is then run, while stirring, into a solution of 29.2 parts of 1-(2'-sulfonphenyl)-5-pyrazolone-3-carboxylic acid of 100 percent strength, 200 parts by volume of water and 25 parts of calcined sodium carbonate. The coupling temperature is kept between 0 and 5° C. Stirring is continued for a further 3–5 hours and the mixture is filtered off. The isolated wet dyestuff so obtained is dissolved at 50–60° C. in a mixture of about 1000 parts by volume of water and 100 parts by volume of 2 N-sulfuric acid. A solution of 25 parts of crystallized copper sulfate in 150 parts by volume of water, having a temperature of 60° C., is then run at about 60° C., while stirring well, into the filtered dyestuff solution. Stirring is continued for 8–10 hours at normal temperature and the precipitated product is then filtered off, stirred for a short time with 300 parts by volume of water, isolated and dried. The reddish orange dyestuff so obtained dissolves readily in organic solvents, alcohol lacquers and nitrocellulose lacquers and is distinguished by an excellent fastness to light.

When the copper sulfate is replaced by 20 parts of crystallized copper acetate and the reaction is performed as described above, a dyestuff of the same properties is obtained.

*Example 2*

19.7 parts of 4-amino-1,1'-azobenzene are diazotized as described in Example 1. The diazo-solution is run, while stirring, into a solution of 37.5 parts of 1-(2',5'-disulfophenyl)-5-pyrazolone-3-carboxylic acid of 100 percent strength, 300 parts by volume of water and 100 parts by volume of a 4 N-sodium acetate solution. Stirring is continued for some hours and the solution is clarified at 80° C. by the addition of kieselguhr. While stirring well, the clarified dyestuff solution is reacted at 60–70° C. with a solution, having the same temperature, of 37.5 parts of crystallized copper sulfate in 200 parts by volume of water and 20 parts by volume of sulfuric acid of 34 percent strength. Stirring is continued for about 8 hours at room temperature and the precipitated dyestuff metal salt is filtered off, washed with 400 parts by volume of water and dried. An orange colored product of a very good fastness to light is obtained.

*Example 3*

19.7 parts of 4-amino-1,1'-azobenzene are diazotized as described in Example 1. In the course of about 25 minutes the diazo-solution is run, while stirring, below the surface of a solution of 29.2 parts of 1-(2'-sulfophenyl)-5-pyrazolone-3-carboxylic acid of 100 percent strength, 200 parts by volume of water and 50 parts by volume of a 4 N-sodium acetate solution. The coupling is brought about at 0–5° C. When the coupling is complete, stirring is continued for some hours, the mixture is heated to about 80–85° C. and 75 parts by volume of sulfuric acid of 34 percent strength are added. The dyestuff dissolves completely and is clarified at this temperature with kieselguhr. The clarified dyestuff solution is reacted at 60° C., while stirring well, with a solution of 23.8 parts of crystallized cobalt chloride in 100 parts by volume of water. Stirring is continued for a further 8–10 hours at room temperature. The cobalt-containing orange dyestuff so obtained is soluble in organic solvents and possesses a very good fastness to light.

When the cobalt chloride is replaced by a water-soluble nickel salt, such as nickel sulfate, or by a zinc salt, such as zinc chloride, the nickel or zinc salt of the dyestuff is obtained with practically the same excellent properties.

*Example 4*

24.1 parts of 4-amino-1,1'-azobenzene-4'-carboxylic acid are dissolved in 300 parts by volume of water, while heating to 80–100° C. 20 parts by volume of a 5 N-sodium nitrite solutions are then added and the whole is run, while stirring, within about 40 minutes into 65 parts by volume of 5 N-hydrochloric acid, while adding ice. Stirring is then continued for 90 minutes at 5–10° C.

In the meantime 29.2 parts of 1-(2'-sulfophenyl)-5-pyrazolone-3-carboxylic acid of 100 percent strength are dissolved in 200 parts by volume of water and 10 parts by volume of a 10 N-sodium hydroxide solution. 100 parts by volume of a 4 N-sodium acetate solution and 10 parts by volume of a 5 N-hydrochloric acid are added to this solution. The above diazo-suspension is then run in within 1 hour, while stirring. Stirring is continued for 90 minutes at 5–10° C. The reaction mixture is then heated to 65–70° C. and the dyestuff dissolves by the addition of 80 parts by volume of a 2 N-sodium hydroxide solution. The dyestuff solution which has been clarified with kieselguhr is reacted at 80° C., while stirring, with a solution of 42 parts of crystallized nickel sulfate, 200 parts by volume of water and 90 parts by volume of sulfuric acid of 34 percent strength. Stirring is continued for 8–10 hours at room temperature, the dyestuff is then filtered off, washed with 300 parts by volume of water and dried. The dyestuff which is soluble in organic solvents and nitrocellulose lacquers has a reddish orange tint and an excellent fastness to light.

*Example 5*

26.2 parts of 4-amino-3,2'-dimethyl-1,1'-azobenzene-hydrochloride are stirred with 300 parts by volume of water and 45 parts by volume of 5 N-hydrochloric acid and diazotized at 5–7° C. with 20 parts by volume of a 5 N-sodium nitrite solution, while adding ice. Stirring is continued for about 1 hour.

The clarified diazo-solution is run, while stirring, into a solution of 29.2 parts of 1-(2'-sulfophenyl)-5-pyrazolone-3-carboxylic acid of 100 percent strength, 200 parts by volume of water and 25 parts of calcined sodium carbonate. The coupling temperature is kept between 0 and 5° C. Stirring is continued for 1–2 hours and the dyestuff is slowly salted out by the addition of 150 parts of sodium chloride. Stirring is continued for a further 2–3 hours. The precipitated moist dyestuff is then dissolved in 1000 parts by volume of hot water and the solution is purified with kieselguhr. The clarified dyestuff solution which has been adjusted to a pH value of about 6.5 by the addition of a small amount of dilute sulfuric acid, is reacted at 60–70° C. with a solution of 25 parts of crystallized copper sulfate in 150 parts by volume of water. Stirring is continued for a further 8–10 hours at normal temperature, the precipitated dyestuff metal salt is then filtered off, washed with 300 parts by volume of water and dried. The reddish orange dyestuff so obtained is soluble in organic solvents and in lacquers and possesses an excellent fastness to light.

*Example 6*

26.2 parts of 4-amino-3,2'-dimethyl-1,1'-azobenzene-hydrochloride are stirred with 300 parts by volume of water and 45 parts by volume of 5 N-hydrochloric acid and diazotized, while adding ice, within about 1 hour at 0–5° C. with 20 parts by volume of a 5 N-sodium nitrite solution. Stirring is continued for further 2 hours.

The diazotization mixture is run within 30 minutes into a solution of 37.5 parts of 1-(2',5'-disulfophenyl)-5-pyrazolone-3-carboxylic acid of 100 percent strength, 300 parts by volume of water and 100 parts by volume of a 4 N-sodium acetate solution. The coupling is brought about at 0–5° C. When the coupling reaction is complete, stirring is continued for some hours at room temperature. The dyestuff is kept in solution and purified at 90° C. with kieselguhr. The clarified dyestuff solution is reacted at 60–70° C. with a solution of 37.5 parts of crystallized copper sulfate, 200 parts by volume of water and 20 parts by volume of sulfuric acid of 34 percent strength. Stirring is continued for 8–10 hours at room temperature, the precipitated dyestuff is filtered off, the filter cake is washed with 100 parts by volume of water and dried. The very reddish orange colored product so obtained has a very good fastness to light.

*Example 7*

26.2 parts of 4-amino-3,2'-dimethyl-1,1'-azobenzene-hydrochloride are diazotized and coupled as described in Example 5. A solution of 28 parts of crystallized nickel sulfate in 150 parts by volume of water and 60 parts by volume of sulfuric acid of 34 percent strength are added at 60–70° C. to the clarified dyestuff solution. Stirring is continued for about 10 hours at room temperature, the precipitated dyestuff is isolated by filtration and washed with 300 parts by volume of water. After drying a very reddish orange colored dyestuff is obtained which is soluble in nitrocellulose lacquers and possesses a high fastness to light.

When the dyestuff is reacted in an analogous manner with a cobalt salt, such as cobalt chloride, the dyestuff cobalt salt so obtained exhibits practically the same valuable properties as the nickel salt described above.

*Example 8*

28.9 parts of 4-amino-2,5,2',4'-tetramethyl-1,1'-azobenzene-hydrochloride are stirred within 15 minutes at 95° C. with 400 parts by volume of water and 50 parts by volume of 5 N-hydrochloric acid. Stirring is continued at room temperature, ice is then added, the solution is diazotized within 1 hour at 0–5° C. with 20 parts by volume of a 5 N-sodium nitrite solution and stirred again for a further 3 hours.

The diazo-solution is run, while stirring well, in the course of about 15 minutes into a solution of 29.2 parts of 1-(2'-sulfophenyl)-5-pyrazolone-3-carboxylic acid of 100 percent strength, 200 parts by volume of water and 50 parts by volume of a 4 N-sodium acetate solution. The coupling temperature is kept at 0–5° C. When the coupling is complete, stirring is continued for some hours at room temperature. The mixture is then heated to 75–80° C. and purified at this temperature with kieselguhr. The dyestuff solution is reacted at 50–60° C. with a solution of 25 parts of crystallized copper sulfate, 150 parts by volume of water and 30 parts by volume of sulfuric acid of 34 percent strength. Stirring is continued for 8–10 hours at normal temperature, the precipitated product is filtered off, washed with 300 parts by volume of water and dried. The yellowish red dyestuff copper salt so obtained is soluble in organic solvents and lacquers and is distinguished by a high fastness to light.

*Example 9*

The dyestuff from 19.7 parts of 4-amino-1,1'-azobenzene and 29.2 parts of 1-(2'-sulfophenyl)-5-pyrazolone-3-carboxylic acid is prepared as described in Example 3. The clarified dyestuff solution is then reacted at room temperature with a mixture of 25 parts of crystallized copper sulfate, 600 parts by volume of water and 440 parts by volume of 0.5 N-dicyclohexylamine sulfate solution. Stirring is continued for 10 hours and the precipitated dyestuff is isolated in the usual manner. The orange-red product so obtained possesses a very good solubility in organic solvents, alcohol lacquers and nitrocellulose lacquers, and an excellent fastness to light.

*Example 10*

The disazo-dyestuff from 28.9 parts of 4-amino-2,5,2',4'-tetramethyl-1,1'-azobenzene-hydrochloride and 29.2 parts of 1-(2'-sulfophenyl)-5-pyrazolone-3-carboxylic acid is prepared and dissolved as described in Example 8. The clarified dyestuff solution is reacted at 75–80° C. with a solution of 13.6 parts of zinc chloride, 150 parts by volume of water and 50 parts by volume of 5 N-hydrochloric acid and stirring is continued at room temperature for a further 8–10 hours. The precipitated product is filtered off, washed with 300 parts by volume of water and dried. The red disazo-dyestuff zinc salt so obtained is soluble in organic solvents and nitrocellulose lacquers and has a very good fastness to light.

When the zinc chloride is replaced by corresponding amounts of a water-soluble cobalt or nickel salt, the cobalt or nickel salt of the above dyestuff is obtained which likewise represents a red powder and exhibits the same excellent fastness to light.

We claim:

1. Salts selected from the group consisting of copper, nickel, cobalt and zinc salts of disazo-dyestuffs corresponding to the following general formula

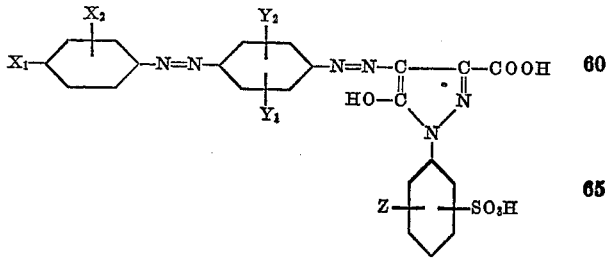

wherein $X_1$ stands for a member selected from the group consisting of hydrogen, methyl and carboxyl, $X_2$ stands for a member selected from the group consisting of hydrogen and methyl, $Y_1$ and $Y_2$ stand for members selected from the group consisting of hydrogen and methyl, and Z stands for a member selected from the group consisting of hydrogen and sulfonic acid.

2. The copper salt of the disazo-dyestuff corresponding to the following formula

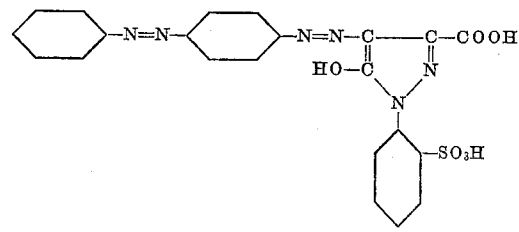

3. The copper salt of the disazo-dyestuff corresponding to the following formula

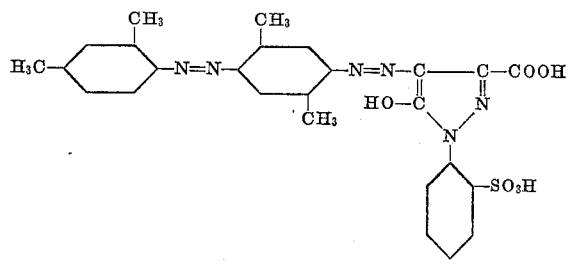

4. The nickel salt of the disazo-dyestuff corresponding to the following formula

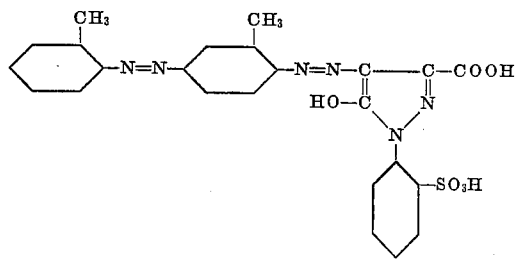

5. The cobalt salt of the disazo-dyestuff corresponding to the following formula

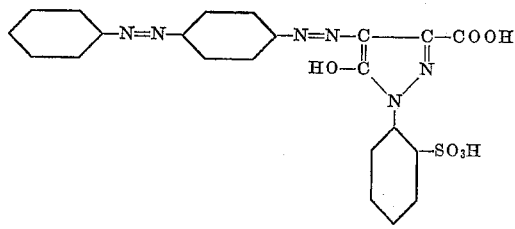

6. The zinc salt of the disazo-dyestuff corresponding to the following formula

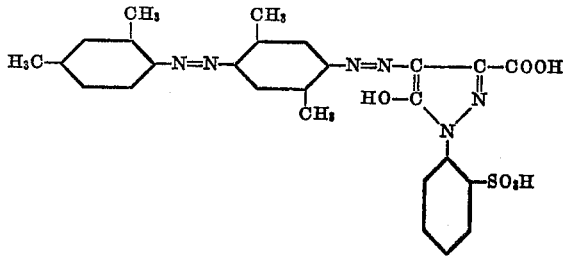

References Cited in the file of this patent

UNITED STATES PATENTS

| | | |
|---|---|---|
| 1,828,599 | Montmollin et al. | Oct. 20, 1931 |
| 2,816,886 | Brenneisen et al. | Dec. 17, 1957 |

FOREIGN PATENTS

| | | |
|---|---|---|
| 641,724 | Germany | Feb. 11, 1937 |